US010009800B2

(12) United States Patent
Hahn et al.

(10) Patent No.: US 10,009,800 B2
(45) Date of Patent: Jun. 26, 2018

(54) METHOD AND SYSTEM FOR PERFORMING HANDOVER FROM A FIXED CELL TO A MOBILE CELL

(71) Applicant: LG ELECTRONICS INC., Seoul (KR)

(72) Inventors: Genebeck Hahn, Seoul (KR); Jaehoon Chung, Seoul (KR); Eunjong Lee, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/319,655

(22) PCT Filed: Mar. 9, 2015

(86) PCT No.: PCT/KR2015/002242
§ 371 (c)(1),
(2) Date: Dec. 16, 2016

(87) PCT Pub. No.: WO2016/003044
PCT Pub. Date: Jan. 7, 2016

(65) Prior Publication Data
US 2017/0142618 A1 May 18, 2017

Related U.S. Application Data

(60) Provisional application No. 62/019,440, filed on Jul. 1, 2014.

(51) Int. Cl.
*H04W 36/00* (2009.01)
*H04W 36/18* (2009.01)
(Continued)

(52) U.S. Cl.
CPC ... *H04W 36/0027* (2013.01); *H04W 36/0094* (2013.01); *H04W 36/18* (2013.01);
(Continued)

(58) Field of Classification Search
CPC . H04W 36/0027; H04W 36/18; H04W 36/30; H04W 36/0094; H04W 72/042;
(Continued)

(56) References Cited

U.S. PATENT DOCUMENTS 9,674,759 B2 * 6/2017 Czaja ................. H04W 36/32
2004/0043798 A1 * 3/2004 Amerga ............. H04B 1/70753
455/574

(Continued)

FOREIGN PATENT DOCUMENTS

EP       1898569 A1    3/2008
JP     2013-502783 A    1/2013
(Continued)

OTHER PUBLICATIONS

3GPP, "3rd Generation Partnership Project; Technical Specification Group Radio Access Network; Study on Mobile Relay for Evolved Universal Terrestrial Radio Access (E-UTRA) (Release 12)," 3GPP TR 36.836 V2.1.0, Jun. 2014, pp. 1-35.

(Continued)

*Primary Examiner* — Meless Zewdu
(74) *Attorney, Agent, or Firm* — Birch, Stewart, Kolasch & Birch, LLP

(57) ABSTRACT

According to one embodiment of the present invention, a user equipment performs handover from a fixed cell to a moving cell by receiving, from the fixed cell, measurement configuration information containing measurement report conditions on the moving cell, if the measurement results on the moving cell satisfy the measurement report conditions, reporting, to the fixed cell, the measurement results on the
(Continued)

moving cell, configuring a secondary connection in the moving cell in addition to a primary connection in the fixed cell, releasing the primary connection in the fixed cell and switching secondary connection in the moving cell to a new primary connection.

13 Claims, 11 Drawing Sheets

(51) Int. Cl.
    *H04W 36/30*     (2009.01)
    *H04W 72/04*     (2009.01)
    *H04W 76/04*     (2009.01)

(52) U.S. Cl.
    CPC ......... *H04W 36/30* (2013.01); *H04W 72/042* (2013.01); *H04W 76/046* (2013.01)

(58) Field of Classification Search
    CPC ... H04W 76/046; H04W 36/00; H04W 76/04; H04W 72/04; H04W 36/38; H04W 36/36; H04W 36/16; H04W 84/005; H04W 24/10; H04W 36/0083; H04W 36/0005; H04W 36/0066
    See application file for complete search history.

(56) References Cited

U.S. PATENT DOCUMENTS

| | | | |
|---|---|---|---|
| 2008/0189970 A1 | 8/2008 | Wang et al. | |
| 2009/0280816 A1* | 11/2009 | Unno | H04W 36/0083 455/440 |
| 2010/0330943 A1* | 12/2010 | Hoepfner | H04B 17/318 455/226.2 |
| 2011/0080895 A1* | 4/2011 | Iwamura | H04W 36/0083 370/332 |
| 2012/0129532 A1 | 5/2012 | Lim et al. | |
| 2012/0282932 A1* | 11/2012 | Yu | H04W 84/005 455/436 |
| 2013/0337811 A1 | 12/2013 | Faerber et al. | |
| 2014/0370930 A1* | 12/2014 | Kurokochi | H04W 16/32 455/522 |
| 2015/0163711 A1* | 6/2015 | Norman | H04W 24/02 455/436 |
| 2015/0181502 A1* | 6/2015 | Hans | H04W 40/22 455/437 |
| 2016/0302143 A1* | 10/2016 | Karlsson | H04W 48/20 |
| 2017/0013519 A1* | 1/2017 | Hahn | H04W 36/0077 |

FOREIGN PATENT DOCUMENTS

| | | |
|---|---|---|
| WO | WO 2011/020481 A1 | 2/2011 |
| WO | WO 2011/052164 A1 | 5/2011 |
| WO | WO 2011/104874 A1 | 9/2011 |
| WO | WO 2014/003508 A1 | 1/2014 |
| WO | WO 2014/010892 A1 | 1/2014 |
| WO | WO 2014/035154 A1 | 3/2014 |

OTHER PUBLICATIONS

Nsn et al., "SeNB change and inter-MeNB handover procedure," 3GPP TSG-RAN WG2 Meeting #85, R2-140371, Prague, Czech Republic, Feb. 10-14, 2014, 6 pages.

\* cited by examiner

METHOD AND SYSTEM FOR PERFORMING HANDOVER FROM A FIXED CELL TO A MOBILE CELL

CROSS REFERENCE TO RELATED APPLICATIONS

This application is the National Phase of PCT International Application No. PCT/KR2015/002242, filed on Mar. 9, 2015, which claims priority under 35 U.S.C. 119(e) to U.S. Provisional Application No. 62/019,440, filed on Jul. 1, 2014, all of which are hereby expressly incorporated by reference into the present application.

TECHNICAL FIELD

The present invention relates to a wireless communication system and, more specifically, to a method and device for performing handover by a UE to a moving cell.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA).

Recently, a radio access network structure has been changed to a structure wherein various types of small cells, for example, pico cells or femto cells interact with a macro cell. As a cell structure is multilayered, a data transmission rate and QoE may be improved. In the 3GPP, indoor/outdoor scenarios based on low power nodes to improve small cells have been discussed. This discussion is disclosed in the 3GPP TR 36.932. Also, dual connectivity for a macro cell and the small cells has been discussed. As described above, in the future wireless communication environment, as many small cells are used, it is expected that a user equipment and cells will be located physically closer.

DISCLOSURE

Technical Problem

An object of the present invention devised to solve the problem lies in a method for efficiently performing handover by a UE to a moving cell.

The technical problems solved by the present invention are not limited to the above technical problems and those skilled in the art may understand other technical problems from the following description.

Technical Solution

In an aspect of the present invention, a method of performing handover to a moving cell by a user equipment (UE) connected to a fixed cell includes: receiving, from the fixed cell, measurement configuration information including a measurement report condition for the moving cell; if a measurement result for the moving cell satisfies the measurement report condition, reporting, to the fixed cell, the measurement result for the moving cell; setting a secondary connection for the moving cell in addition to a primary connection for the fixed cell; and performing handover to the moving cell by releasing the primary connection for the fixed cell and switching the secondary connection for the moving cell to the primary connection.

In another aspect of the present invention, a UE performing handover from a fixed cell to a moving cell includes: a receiver for receiving, from the fixed cell, measurement configuration information including a measurement report condition for the moving cell; a transmitter for reporting, to the fixed cell, a measurement result for the moving cell if the measurement result for the moving cell satisfies the measurement report condition; and a processor for setting a secondary connection for the moving cell in addition to a primary connection for the fixed cell and performing handover to the moving cell by releasing the primary connection for the fixed cell and switching the secondary connection for the moving cell to the primary connection.

The UE may measure the moving cell at least twice to determine whether to report the measurement result for the moving cell. For example, the UE may determine that the measurement result for the moving cell are reported to the fixed cell when a signal quality of the moving cell is higher than a signal quality of the fixed cell by a predetermined offset or more at both a first time and a second time. The UE may determine that the measurement result for the moving cell are reported to the fixed cell when the signal quality of the moving cell is higher than a predetermined threshold at both the first time and the second time.

The measurement configuration information may include information about a moving cell measurement time interval. The information about the moving cell measurement time interval may be determined on the basis of at least one of a moving speed of the moving cell and a moving speed of the UE.

The UE may receive a message including a condition for switching the secondary connection for the moving cell to the primary connection. For example, the condition for switching the secondary connection for the moving cell to the primary connection may include at least one of a case in which the signal quality of the fixed cell becomes lower than a first threshold and a case in which the signal quality of the moving cell becomes higher than a second threshold after a specific time.

In another aspect of the present invention, a method of supporting handover of a UE by a fixed cell includes: transmitting, to the UE, measurement configuration information including a measurement report condition for a moving cell connected to the fixed cell; if a measurement result for the moving cell satisfies the measurement report condition, receiving the measurement result for the moving cell from the UE; and transmitting, to the UE, an RRC connection reconfiguration message instructing the UE to set a secondary connection for the moving cell in addition to a primary connection for the fixed cell, wherein the RRC connection reconfiguration message includes a condition for releasing the primary connection for the fixed cell and switching the secondary connection for the moving cell to the primary connection for handover of the UE to the moving cell.

In another aspect of the present invention, a fixed cell supporting handover of a UE includes: a transmitter for transmitting, to the UE, measurement configuration information including a measurement report condition for a moving cell connected to the fixed cell; a receiver for receiving a measurement result for the moving cell from the UE if the measurement result for the moving cell satisfies the measurement report condition; and a processor for generating an RRC connection reconfiguration message instructing the UE to set a secondary connection for the moving cell in addition to a primary connection for the fixed cell, wherein the RRC connection reconfiguration message includes a condition for releasing the primary connection for the fixed cell and switching the secondary connection for the moving cell to the primary connection for handover of the UE to the moving cell.

Advantageous Effects

According to an embodiment of the present invention, it is possible to solve a problem that a UE performs unnecessary handover to a moving cell that moves along a path different from that of the UE since cell mobility is considered in handover of the UE and to minimize data disconnection in handover because the UE establishes a wireless connection with a moving cell while maintaining a wireless connection with a fixed cell.

The effects of the present invention are not limited to the above-described effects and other effects which are not described herein will become apparent to those skilled in the art from the following description.

BEST MODE

Figure 1:
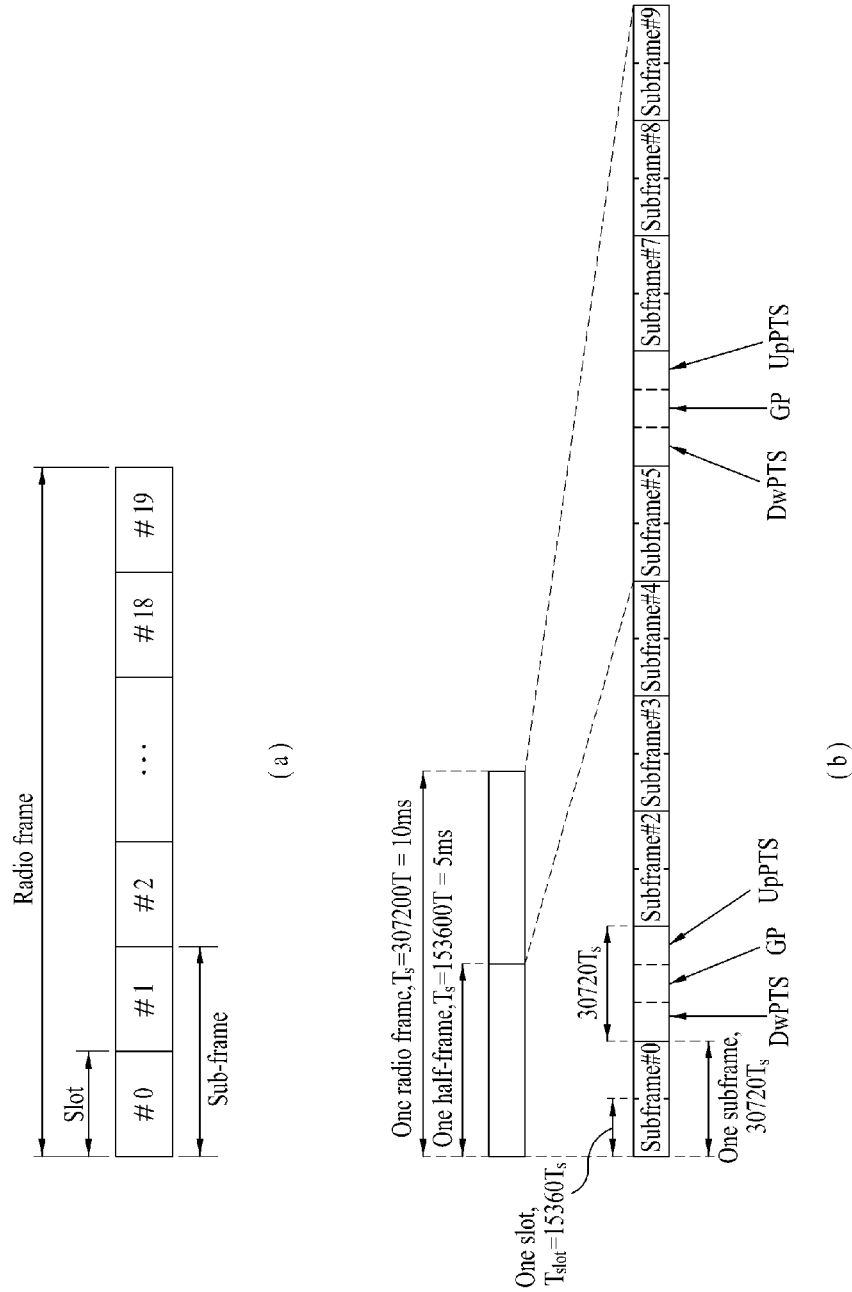
FIG. 1 illustrates a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used in the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a radio frame structure of 3GPP LTE with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

In a case where a normal CP is used, a slot includes 7 OFDM symbols and 1 subframe includes 15 OFDM symbols. Here, the first 2 or 3 OFDM symbols of each subframe can be allocated to PDCCH (physical downlink control channel), and the other OFDM symbols can be allocated to PDSCH (physical downlink shared channel).

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between UL and DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 2:
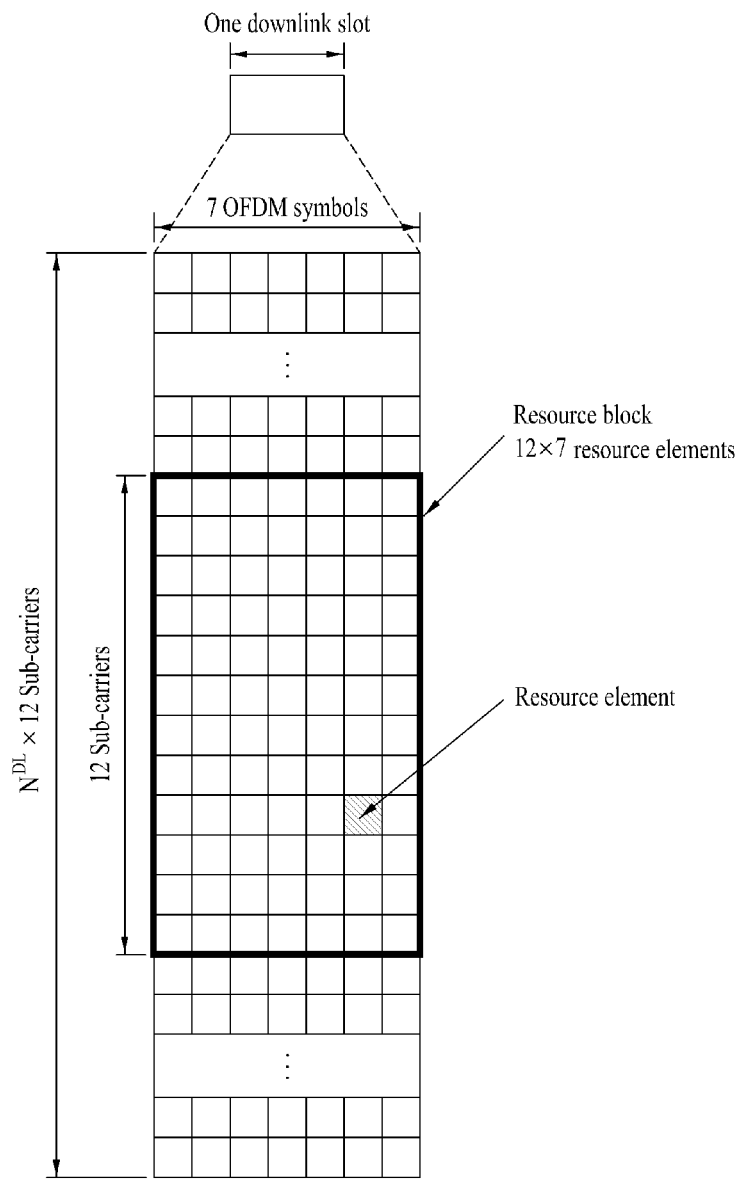
FIG. 2 illustrates a resource grid in a downlink slot.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 3:
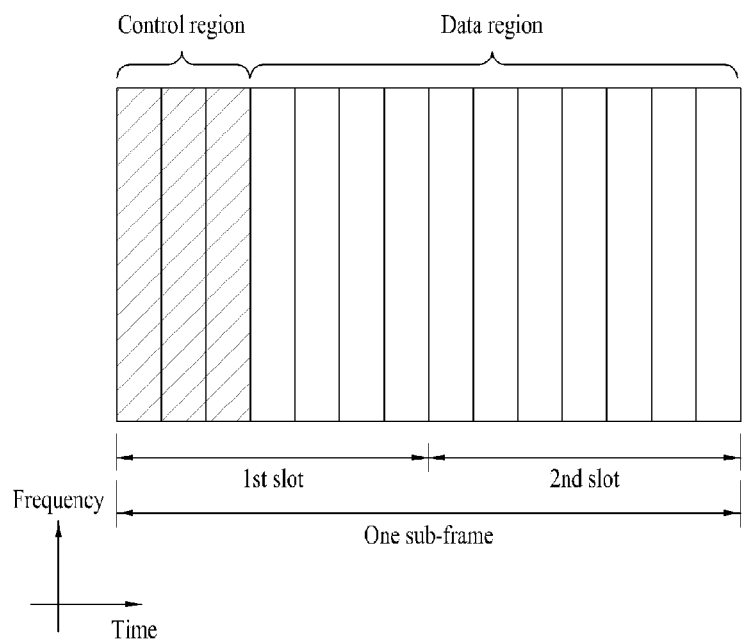
FIG. 3 illustrates a structure of a downlink subframe.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response to uplink transmission and carries HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of voice over IP (VoIP), etc. A plurality of PDCCHs can be transmitted within a control region. The UE can monitor the plurality of PDCCHs. The PDCCH is transmitted on an aggregate of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
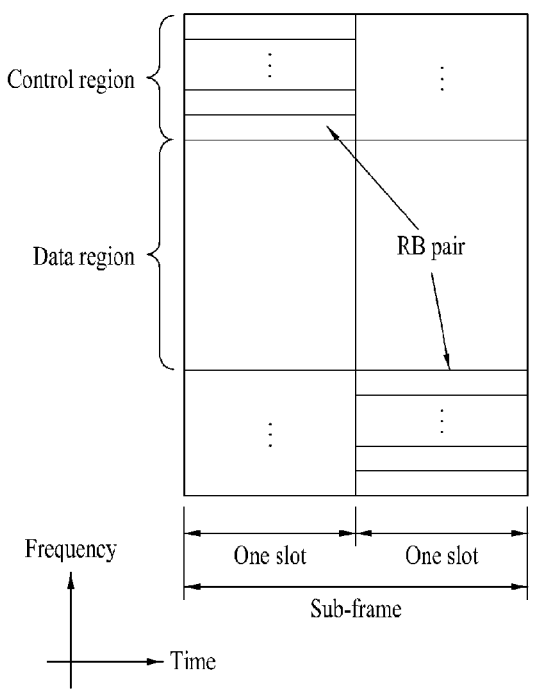
FIG. 4 illustrates a structure of an uplink subframe.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

PSS (Primary Synchronous Signal)/SSS (Secondary Synchronous Signal)

Figure 5:
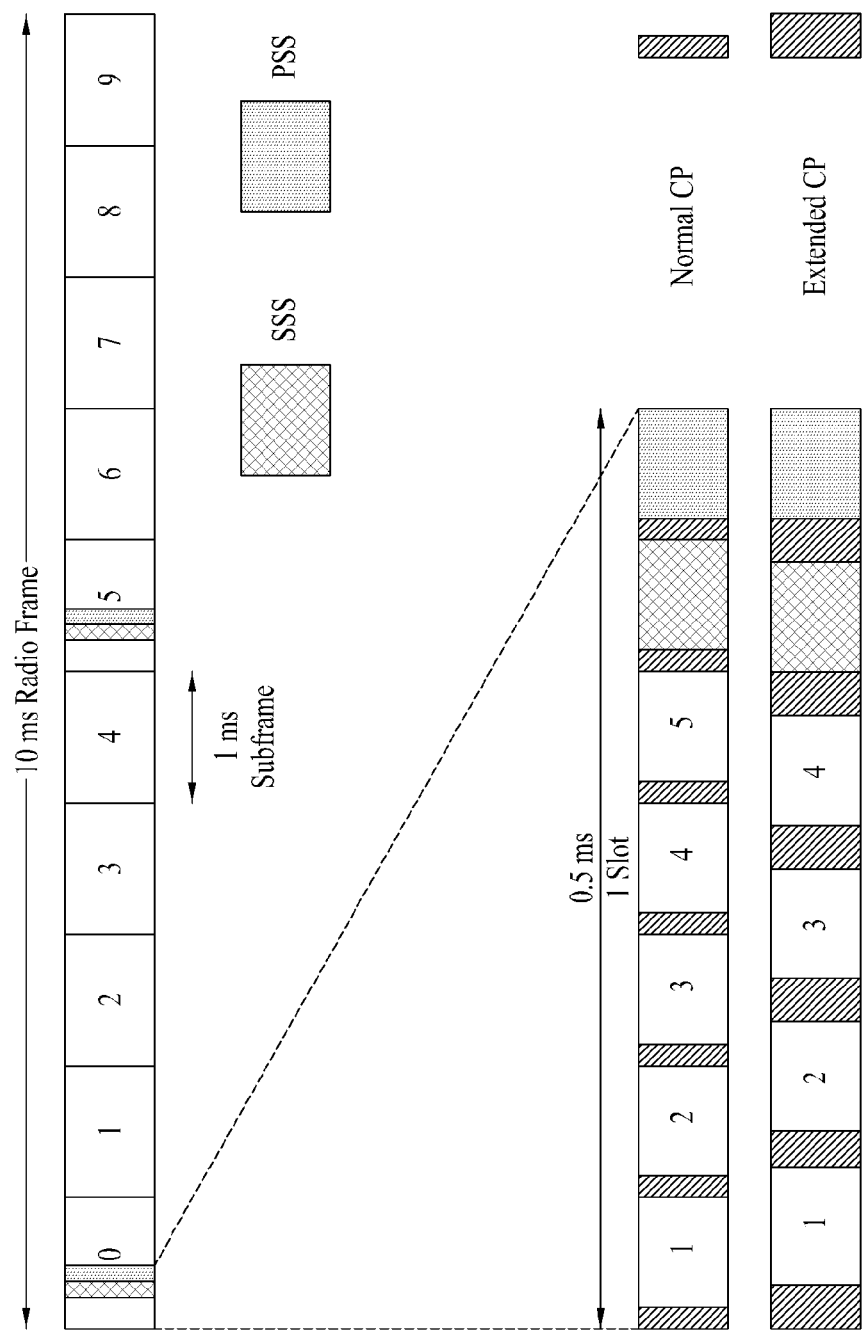
FIG. 5 illustrates a PSS/SSS in an FDD system.

FIG. 5 is a diagram illustrating a PSS and an SSS, which are synchronous signals used for cell search in an LTE/LTE-A system. Cell search will be described prior to description of the PSS and the SSS. When the user equipment is initially connected to a cell, cell search is performed if the user equipment performs handover from a cell, to which the user equipment is currently connected, to another cell, or is performed for cell reselection. Cell search may be performed by frequency and symbol synchronous acquisition of the cell, downlink frame synchronous acquisition of the cell, and determination of cell identifier (ID). Three cell IDs may constitute one cell group, and 168 cell groups may exist.

For cell search, a base station transmits the PSS and the SSS. The user equipment may acquire 5 ms timing of the cell by detecting the PSS and identify cell ID within the cell group. In addition, the user equipment may identify radio frame timing and cell group by detecting the SSS.

Referring to FIG. 5, the PSS is transmitted from subframes 0 and 5. In more detail, the PSS is transmitted from the last OFDM symbol of the first slot at subframes 0 and 5. In addition, the SSS is transmitted from the last second OFDM symbol of the first slot of subframes 0 and 5. That is, the SSS is transmitted from the OFDM symbol just before the PSS is transmitted. This transmission timing corresponds to FDD (Frequency Division Duplex). In case of TDD (Time Division Duplex), the PSS is transmitted from the third symbol of subframes 1 and 6, that is, DwPTS, and the SSS is transmitted from the last symbol of subframes 0 and 5. That is, in TDD, the SSS is transmitted as much as three symbols prior to the PSS.

The PSS is a Zadoff-Chu sequence of length 63, and in real transmission, 0 is padded at both ends of the sequence, whereby the sequence is transmitted on 73 subcarriers (72 subcarriers except DC subcarrier, that is, 6 RBs) in the middle of a system frequency bandwidth. The SSS is a sequence of length 62, which is obtained as two sequences of length 31 are frequency-interleaved, and is transmitted on 72 subcarriers in the middle of a full system bandwidth in the same manner as the PSS.

PBCH (Physical Broadcast Channel)

Figure 6:
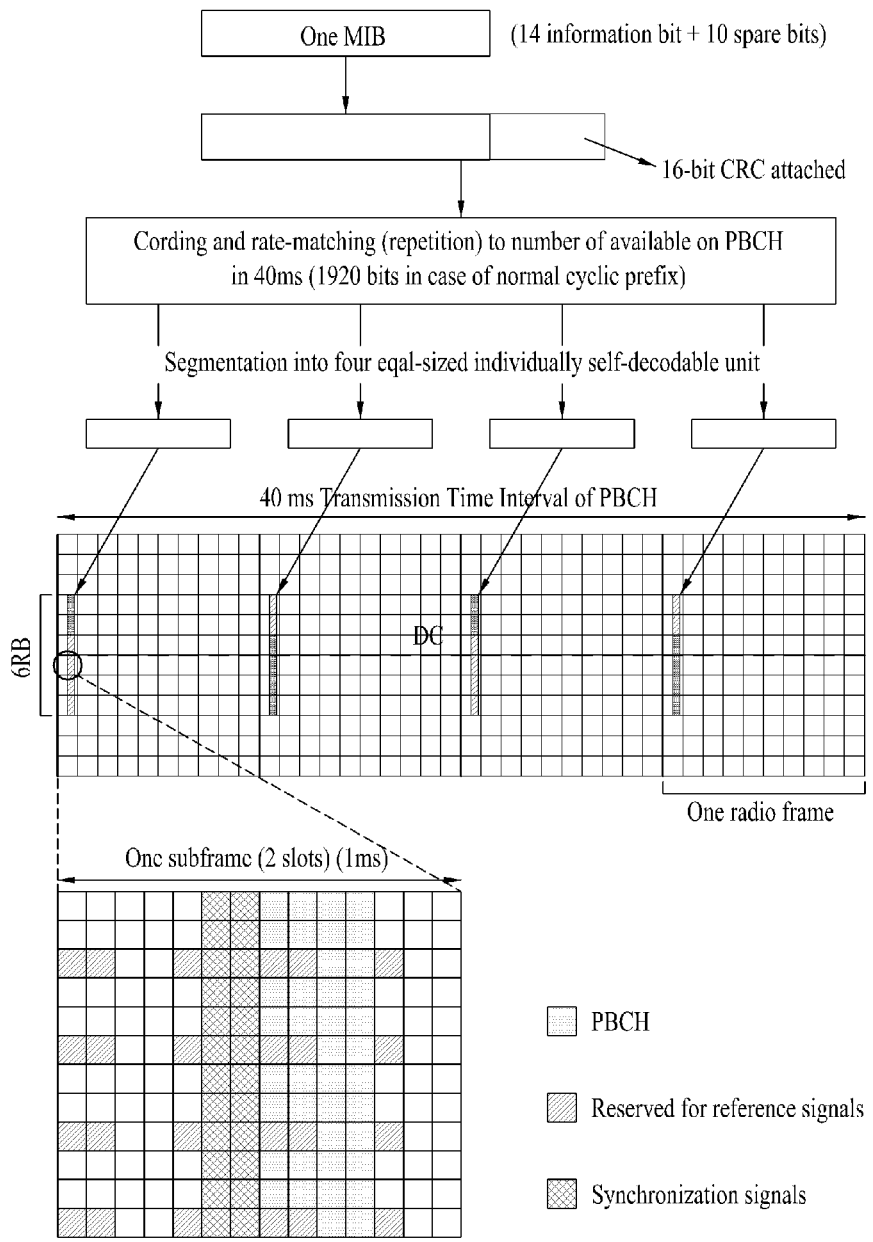
FIG. 6 illustrates a PBCH.

FIG. 6 is a diagram illustrating a physical broadcast channel (PBCH). The PBCH is the channel to which system information corresponding to a master information block (MIB) is transmitted, and is used to allow the user equipment to obtain system information after acquiring downlink synchronization and cell ID through the aforementioned PSS/SSS. In this case, the MIB may include downlink cell bandwidth information, PHICH configuration information, subframe number (SFN), etc.

One MIB, as shown in FIG. 6, is transmitted through a first subframe of each of four continuous radio frames. In more detail, the PBCH is transmitted from first four OFDM symbols of the second slot of the subframe 0 at four continuous radio frames. Accordingly, the PBCH for transmitting one MIB is transmitted at a period of 40 ms. The PBCH is transmitted on 72 subcarriers in the middle of the full bandwidth on a frequency axis, which corresponds to the smallest downlink bandwidth, 6 RBs. This serves to allow the user equipment to decode BCH without problem even though the user equipment does not know the size of the full system bandwidth.

(Carrier Aggregation)

Prior to description of carrier aggregation, the concept of cell introduced to manage radio resources in LTE-A will be described first. A cell may be understood as a combination of downlink resources and uplink resources. Here, the uplink resource is not an essential element of the cell. Accordingly, a cell may include only downlink resources or include downlink resources and uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and the SCell may be used to provide additional radio resources. In the carrier aggregation environment, all serving cells except the PCell may be viewed as SCells. In the case in which a UE is in an RRC_CONNECTED state but carrier aggregation is not established or in a case in which the UE does not support carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Carrier aggregation is a technology that has been introduced to allow for use of a broader band in order to meet the requirements of a high transmission rate. Carrier aggregation may be defined as an aggregate of two or more component carriers (CCs) having different carrier frequencies or an aggregate of two or more cells. Here the CCs may be consecutive in frequency domain, or may not be consecutive in frequency domain.

The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to M(<N) CCs. Various parameters for carrier aggregation may be set up in a cell-specific, UE group-specific, or UE-specific manner.

Cross-carrier scheduling refers to, for example, including all downlink scheduling allocation information about a DL CC in the control region of another DL CC for one of multiple serving cells or including all uplink scheduling grant information about multiple UL CCs linked to a DL CC for one of multiple serving cells in the control region of the DL CC.

Regarding cross-carrier scheduling, a carrier indicator field (CIF) will be described first. The CIF may be included in the DCI format transmitted over the PDCCH (and be defined to have, for example, a size of 3 bits), or may not be included in the DCI format (in this case, the CIF may be defined to have, for example, a size of 0 bits). If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, downlink allocation information about DL CC B and DL CC C, i.e., information about PDSCH resources, is transmitted over the PDCCH within the control region of DL CC A. The UE may monitor DL CC A so as to recognize the resource region of the PDSCH and the corresponding CC through the CIF.

Whether or not the CIF is included in the PDCCH may be semi-statically set, and the CIF may be UE-specifically enabled by higher-layer signaling.

When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping, DCI format, and so on, as in the legacy PDCCH structure, may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. The coding scheme, CCE-based resource mapping, DCI format, and so on of the legacy PDCCH structure may be applied to this case.

When the CIF exists, an eNB may allocate a DL CC set in which the PDCCH is to be monitored. Accordingly, the burden of blind decoding to the UE may be lessened. The PDCCH monitoring CC set corresponds to a portion of all aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically or UE group-specifically or cell-specifically configured. For example, when 3 DL CCs are aggregated, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case where the DL CC A is configured as the PDCCH monitoring CC, the PDCCH may not be transmitted in DL CC B and DL CC C.

Handover to Fixed Cell

Figure 7:
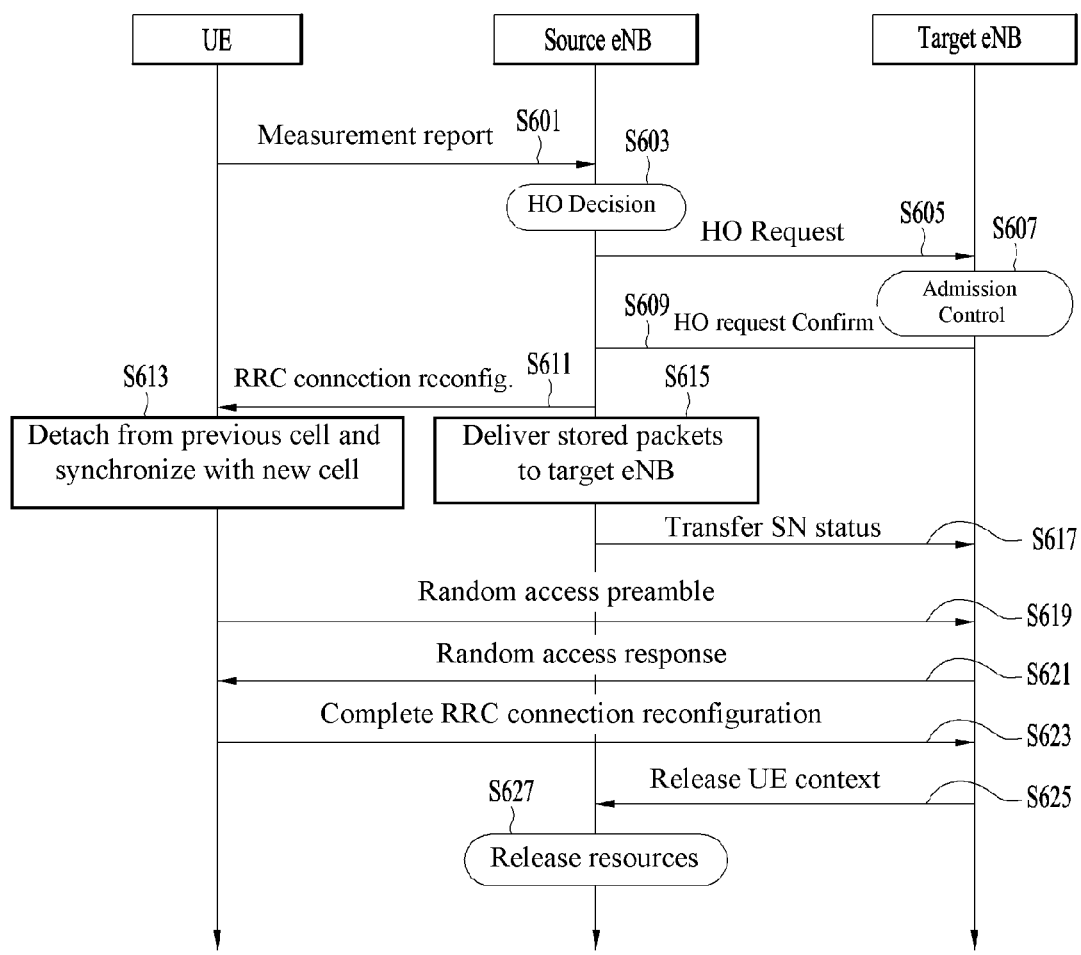
FIG. 7 illustrates a procedure through which a UE hands over to a fixed cell.

FIG. 7 illustrates a procedure through which a UE hands over to a fixed cell.

In FIG. 7, a network system may include a UE, a source eNB and a target eNB. The source eNB is a serving eNB (or serving cell) that provides a scheduling service to the UE and the target eNB (or target cell) is an eNB that provides a scheduling service to the UE that has performed handover.

Referring to FIG. 7, the UE transmits a measurement report message including a measurement result for a neighbor cell to the source eNB (S601). Here, a measurement report may include a reference signal received power (RSRP), a received signal strength indicator (RSSI), reference signal received quality (RSRQ) and the like. The RSRP is a measurement value that can be obtained by measuring the magnitude of a downlink RS. The RSSI is a total receive power value at the UE and includes interference and noise power from neighbor cells. The RSRQ is a value obtained on the basis of N*RSRP/RSSI. Here, N is the number of RBs of a bandwidth during RSSI measurement.

Transmission of the measurement result can be determined by the following event based measurement result determination. Events for measurement result determination may include at least one of i) a case in which a serving cell becomes better than an absolute threshold, ii) a case in which the serving cell becomes worse than the absolute threshold, iii) a case in which a neighboring cell becomes better than an offset relative to the serving cell, iv) a case in which the neighboring cell becomes better than the absolute threshold and v) a case in which the serving cell becomes worse than one absolute threshold and the neighboring cell becomes better than another absolute threshold. However, the present invention is not limited thereto. Here, a measurement value may be the aforementioned RSRP or the like. In a carrier aggregation environment, the serving cell can refer to a PCell or an SCell depending on an event.

The source eNB may determine whether the UE will perform handover and the target eNB to which the UE will hand over (S603).

The source eNB may transmit a handover request message to the target eNB in order to perform handover (S605). For example, the source eNB provides radio resource control (RRC) context information of the UE to the target eNB.

The target eNB determines whether to approve handover of the UE on the basis of the RRC context information (S607).

When handover of the UE is approved, the target eNB transmits a handover (HO) request acknowledge message to the source eNB (S609).

Upon reception of the HO request acknowledgement message, the source eNB sends an RRC connection reconfiguration message to the UE to instruct the UE to perform a HO procedure (S611). The RRC connection reconfiguration message may include radio resource configuration information, security setting, cell ID (C-RNTI) and the like, which are commonly applied to UEs served by the target eNB. For example, the RRC connection reconfiguration message can include at least one of a measurement configuration IE (information element), a mobility control IE, a radio resource configuration IE (e.g. RBs, a MAC configuration and a physical channel configuration of the target eNB, and SIB including system information of the target eNB) and a security configuration IE.

Table 1 shows the RRC connection reconfiguration message.

```
RRCConnectionReconfiguration ::=        SEQUENCE {
    rrc-TransactionIdentifier               RRC-TransactionIdentifier,
    criticalExtensions                      CHOICE {
        c1                                      CHOICE{
            rrcConnectionReconfiguration-r8         RRCConnectionReconfiguration-r8-IEs,
            spare7 NULL,
            spare6 NULL, spare5 NULL, spare4 NULL,
            spare3 NULL, spare2 NULL, spare1 NULL
    },
```

```
        criticalExtensionsFuture                  SEQUENCE { } }}
RRCConnectionReconfiguration-r8-IEs ::= SEQUENCE {
    measConfig                                   MeasConfig                              OPTIONAL, -- Need ON
    mobilityControlInfo                          MobilityControlInfo                     OPTIONAL, -- Cond HO
    dedicatedInfoNASList                         SEQUENCE (SIZE(1..maxDRB)) OF
                                                 DedicatedInfoNAS                        OPTIONAL, -- Cond
nonHO
    radioResourceConfigDedicated                 RadioResourceConfigDedicated            OPTIONAL, -- Cond HO-
toEUTRA
    securityConfigHO                             SecurityConfigHO                        OPTIONAL, -- Cond HO
    nonCriticalExtension                         RRCConnectionReconfigutation-v890-IEs            OPTIONAL --
Need OP}
RRCConnectionReconfiguration-v890-IEs ::= SEQUENCE {
    lateNonCriticalExtension                     OCTET STRING                            OPTIONAL, -- Need OP
    nonCriticalExtension                         RRCConnectionReconfiguration-v920-IEs            OPTIONAL --
Need OP}
RRCConnectionReconfiguration-v920-IEs ::= SEQUENCE {
    otherConfig-r9                               OtherConfig-r9                          OPTIONAL, -- Need ON
    fullConfig-r9                                ENUMERATED {true}                       OPTIONAL, -- Cond
HO-Reestab
    nonCriticalExtension                         RRCConnectionReconfiguration-V1020-IEs           OPTIONAL --
Need OP}
RRCConnectionReconfiguration-v1020-IEs ::= SEQUENCE {
    sCellToReleaseList-r10                       SCellToReleaseList-r10                  OPTIONAL, -- Need ON
    sCellToAddModList-r10                        SCellToAddModList-r10                   OPTIONAL, -- Need ON
    nonCriticalExtension                         RRCConnectionReconfiguration-v1130-IEs           OPTIONAL --
Need OP}
RRCConnectionReconfiguration-v1130-IEs ::= SEQUENCE {
    systemInfomationBlockType1Dedicated-r11 OCTET STRING (CONTAINING
SystemInformationBlockType1)
    nonCriticalExtension                         SEQUENCE { }                            OPTIONAL -- Need
OP}
SCellToAddModList-r10 ::=                        SEQUENCE (SIZE (1..maxSCell-r10)) OF SCellToAddMod-r10
SCellToAddMod-r10 ::=                            SEQUENCE {
    sCellIndex-r10                               SCellIndex-r10,
    cellIdentification-r10                       SEQUENCE {
        physCellId-r10                               PhysCellId,
        dl-CarrierFreq-r10                           ARFCN-ValueEUTRA
    }                                                                                    OPTIONAL, -- Cond
SCellAdd
    radioResourceConfigCommonSCell-r10           RadioResourceConfigCommonSCell-r10                OPTIONAL, --
Cond SCellAdd
    radioResourceConfigDedicatedSCell-r10        RadioResourceConfigDedicatedSCell-r10             OPTIONAL,
    ...,
    [[ dl-CarrierFreq-v1090                      ARFCN-ValueEUTRA-v9e0                   OPTIONAL -- Cond
EARFCN-max
    ]]}
SCellToReleaseList-r10 ::=                       SEQUENCE (SIZE (1..maxSCell-r10)) OF SCellIndex-r10
SecurityConfigHO ::=                             SEQUENCE {
    handoverType                                     CHOICE {
        intraLTE                                         SEQUENCE {
            securityAlgorithmConfig                          SecurityAlgorithmConfig     OPTIONAL, --
Cond fullConfig
            keyChangeIndicator                               BOOLEAN,
            nextHopChainingCount                             NextHopChainingCount                  },
        interRAT                                         SEQUENCE {
            securityAlgorithmConfig                          SecurityAlgorithmConfig,
            nas-SecurityParamToEUTRA                         OCTET STRING (SIZE (6))               } }
```

Table 2 shows part of the mobility control IE included in the RRC connection reconfiguration message.

TABLE 2

```
MobilityControlInfo ::=          SEQUENCE {
    targetPhysCellId                 PhysCellId,
    carrierFreq                      CarrierFreqEUTRA             OPTIONAL, -- Cond
HO-toEUTRA2
    carrierBandwidth                 CarrierBandwidthEUTRA        OPTIONAL, --
Cond HO-toEUTRA
    additionalSpectrumEmission       AdditionalSpectrumEmission   OPTIONAL, --
Cond HO-toEUTRA
    t304                             ENUMERATED {
                                         ms50, ms100, ms150, ms200, ms500, ms1000,
                                         ms2000, spare1},
    newUE-Identity                   C-RNTI,
    radioResourceConfigCommon        RadioResourceConfigCommon,
```

TABLE 2-continued

| | | |
|---|---|---|
| rach-ConfigDedicated | RACH-ConfigDedicated | OPTIONAL, -- Need OP |
| ..., | | |
| [[ carrierFreq-v9e0 | CarrierFreqEUTRA-v9e0 | OPTIONAL -- Need ON |
| ]], | | |
| [[ drb-ContinueROHC-r11 | ENUMERATED {true} | OPTIONAL -- Cond HO |
| ]]} | | |

Table 3 shows part of a radioResourceConfigCommon IE included in the mobility control IE.

TABLE 3

| | | |
|---|---|---|
| RadioResourceConfigCommonSIB ::= | SEQUENCE { | |
| rach-ConfigCommon | RACH-ConfigCommon, | |
| bcch-Config | BCCH-Config, | |
| pcch-Config | PCCH-Config, | |
| prach-Config | PRACH-ConfigSIB, | |
| pdsch-ConfigCommon | PDSCH-ConfigCommon, | |
| pusch-ConfigCommon | PUSCH-ConfigCommon, | |
| pucch-ConfigCommon | PUCCH-ConfigCommon, | |
| soundingRS-UL-ConfigCommon | SoundingRS-UL-ConfigCommon, | |
| uplinkPowerControlCommon | UplinkPowerControlCommon, | |
| ul-CyclicPrefixLength | UL-CyclicPrefixLength, | |
| ..., | | |
| [[ uplinkPowerControlCommon-v1020 | UplinkPowerControlCommon-v1020 | OPTIONAL -- Need OR |
| ]]} | | |
| RadioResourceConfigCommon ::= | SEQUENCE { | |
| rach-ConfigCommon | RACH-ConfigCommon | OPTIONAL, -- Need ON |
| prach-Config | PRACH-Config, | |
| pdsch-ConfigCommon | PDSCH-ConfigCommon | OPTIONAL, -- Need ON |
| pusch-ConfigCommon | PUSCH-ConfigCommon, | |
| phich-Config | PHICH-Config | OPTIONAL, -- Need ON |
| pucch-ConfigCommon | PUCCH-ConfigCommon | OPTIONAL, -- Need ON |
| soundingRS-UL-ConfigCommon | SoundingRS-UL-ConfigCommon | OPTIONAL, -- Need ON |
| uplinkPowerControlCommon | UplinkPowerControlCommon | OPTIONAL, -- Need ON |
| antennaInfoCommon | AntennaInfoCommon | OPTIONAL, -- Need ON |
| p-Max | P-Max | OPTIONAL, -- Need OP |
| tdd-Config | TDD-Config | OPTIONAL, -- Cond TDD |
| ul-CyclicPrefixLength | UL-CyclicPrefixLength, | |
| ..., | | |
| [[ uplinkPowerControlCommon-v102 | UplinkPowerControlCommon-v1020 | OPTIONAL -- Need ON |
| ]], | | |
| [[ tdd-Config-v1130 | TDD-Config-v1130 | OPTIONAL -- Cond TDD3 |
| ]]} | | |

Table 4 shows a RACH-ConfigDedicated IE included in the mobility control IE.

TABLE 4

| | |
|---|---|
| RACH-ConfigDedicated ::= | SEQUENCE { |
| ra-PreambleIndex | INTEGER (0..63), |
| ra-PRACH-MaskIndex | INTEGER (0..15)} |

Upon reception of the RRC connection reconfiguration message, the UE may detach from the previous cell (i.e., source eNB) and synchronize with the new cell (i.e. target eNB) (S613).

The source eNB delivers packets to be transmitted to the UE to the target eNB because the source eNB knows the target eNB to which the UE will hand over (S615).

The source eNB sends a sequence number (SN) state delivery message to the target eNB in order to deliver buffered data or packets to the target eNB (S617).

Upon reception of the RRC connection reconfiguration message, the UE initiates a contention-free random access procedure to the target eNB. For example, the eNB transmits a random access preamble (S619). The UE randomly selects one random access preamble from a random access preamble set indicated through a handover command, selects a physical RACH (PRACH) resource capable of delivering the random access preamble and transmits the random access preamble through the PRACH resource. The target eNB sends a timing advance (TA) information to the UE in response to the random access preamble through a media access control (MAC) message or an RRC message for uplink resource allocation information and uplink synchronization (S621).

The UE transmits an RRC connection reconfiguration complete message to the target eNB on the basis of the uplink resource allocation information and the TA information (S623).

If the target eNB receives the RRC connection reconfiguration complete message from the UE, the target eNB transmits a UE context release message for requesting release of information related to the UE (S625).

Upon reception of the UE context release message, the serving eNB releases resources for the UE and completes the handover procedure (S627).

The aforementioned handover procedure of the UE is divided into handover preparation, handover execution and handover completion processes and the handover execution process requires the longest time. A handover execution time refers to a period from when the UE receives the RRC connection reconfiguration message from the source eNB (S611) to when the target eNB receives the handover connection reconfiguration complete message from the UE (S623). The UE disconnects from the source eNB and ceases data reception from the source eNB while processing the RRC connection reconfiguration message in the handover execution process. Before the UE performs synchronization with the target eNB and sets connection thereto, the source eNB forwards downlink data of the UE to the target eNB. Data forwarding is performed more rapidly than a radio resource reconfiguration procedure. Accordingly, the data forwarded to the target eNB is stored in a buffer of the target eNB and waits to be transmitted to the UE until the UE prepares for data reception from the target eNB.

A period from when the UE detaches from the source eNB upon reception of the RRC connection reconfiguration message to when the UE completes RRC connection reconfiguration through synchronization with the target eNB is defined as a data interruption time. The data interruption time is approximately 10.5 ms in present mobile communication systems, a time required for each process is shown in Table 5.

TABLE 5

| Description | Time [ms] |
|---|---|
| Radio Synchronization to the target cell | 1 |
| Average delay due to RACH scheduling period (1 ms periodicity) | 0.5 |
| RACH Preamble | 1 |
| Preamble detection and transmission of RA response (Time between the end of RACH transmission and UE's reception of scheduling grant and timing adjustment) | 5 |
| Decoding of scheduling grant and timing alignment | 2 |
| Transmission of DL Data | 1 |
| Total delay | 10.5 |

Measurement and Reporting for Fixed Cell

Figure 8:
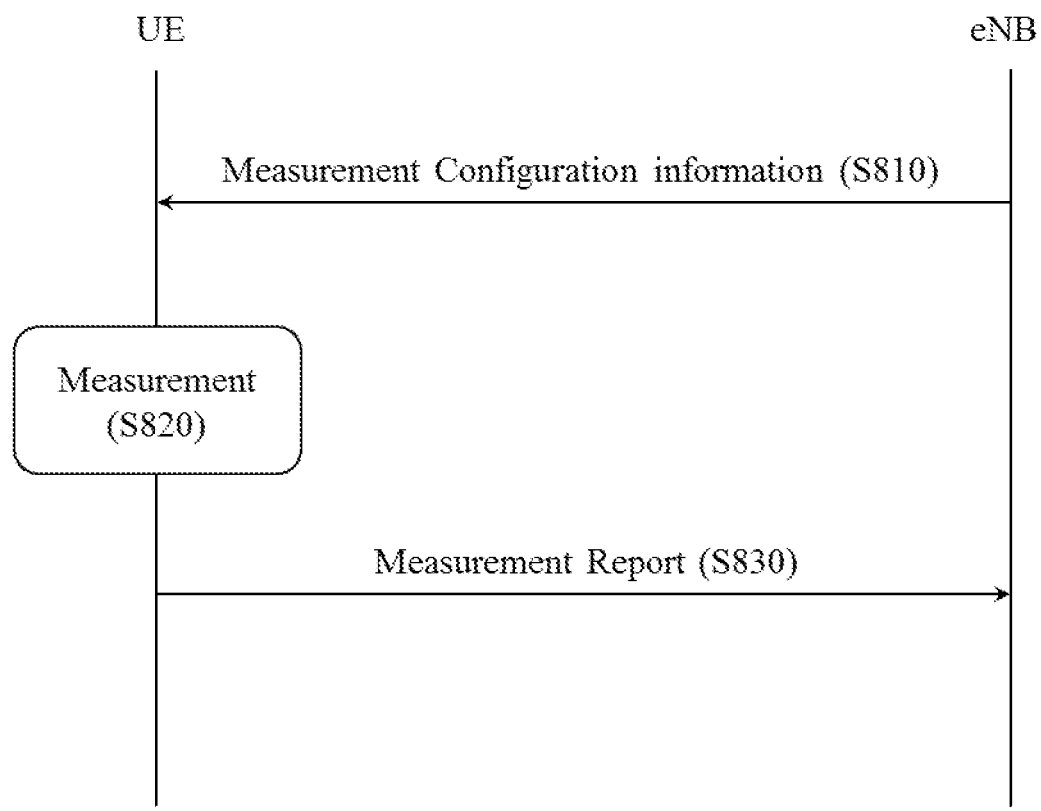
FIG. 8 illustrates a procedure through which a UE measures and reports a cell.

FIG. 8 illustrates a procedure through which a UE performs measurement for a fixed cell and reports a measurement result to a network.

The UE may receive measurement configuration information from an eNB (S810). In the following, a message including such measurement configuration information is referred to as a measurement configuration message. The UE may perform measurement on the basis of the measurement configuration information (S820). The UE may report a measurement result to the eNB if the measurement result satisfies reporting conditions included in the measurement configuration information (S830). Hereinafter, a message including the measurement report is referred to as a measurement report message.

The measurement configuration information may include the following information.

(1) Measurement object information: this is information about an object that is to be measured by the UE. The measurement object includes at least one of an intra-frequency measurement object corresponding to an intra-cell measurement object, an inter-frequency measurement object corresponding to an inter-cell measurement object, and an inter-RAT measurement object. For example, the intra-frequency measurement object can indicate a neighbor cell having the same frequency band as a serving cell, the inter-frequency measurement object can indicate a neighbor cell having a frequency band different from that of the serving cell, and the inter-RAT measurement object can indicate a neighbor cell having a RAT different from that of the serving cell.

(2) Reporting configuration information: this is information about reporting conditions and reporting type with respect to whether the UE reports the measurement result. The reporting conditions may include information about events or cycles that trigger measurement result reporting. The reporting type is information about a measurement result configuration type.

(3) Measurement identity information: this is information about measurement identity by which the UE determines a measurement object, measurement time and measurement type in association with the measurement object and reporting configuration. The measurement identity information is included in the measurement report message and indicates a measurement object corresponding to the measurement result and reporting conditions on which the measurement report is based.

(4) Quantity configuration information: this is information about parameters for setting a measurement unit, a reporting unit and/or measurement result value filtering.

(5) Measurement gap information: this is information about a measurement gap corresponding to a period that can be used for measurement only by the UE without regard to data transmission to/from the serving cell because downlink or uplink transmission is not scheduled.

The UE may have a measurement object list, a measurement report configuration list and a measurement identity list in order to perform a measurement procedure.

In 3GPP LTE, the eNB can set only one measurement object for the UE per frequency band. According to 3GPP TS 36.331, events that trigger measurement reporting are defined, as shown in the following table.

TABLE 6

| Event | Reporting conditions |
|---|---|
| Event A1 | Serving becomes better than threshold |
| Event A2 | Serving becomes worse than threshold |
| Event A3 | Neighbor becomes offset better than PCell |
| Event A4 | Neighbor becomes better than threshold |
| Event A5 | PCell becomes worse than threshold1 and neighbor becomes better than threshold2 |
| Event A6 | Neighbor becomes offset better than SCell |

If the measurement result of the UE satisfies such events, the UE transmits the measurement report message to the eNB.

Moving Cell

In a hierarchical cell structure including macro cells and small cells, a moving cell can be considered as a small cell. The moving cell may be a small eNB mounted on a physically moving apparatus (e.g., transportation means such as a bus, a train or a smart car). A macro cell may be a fixed cell.

Since a fixed cell (or macro cell) and a moving cell form a hierarchical cell structure, the macro cell may regard the moving cell and a UE as similar objects. However, the moving cell needs to transmit and receive large-capacity aggregated traffic of a plurality of UEs, distinguished from normal UEs. Accordingly, a radio backhaul link that supports large-capacity aggregated traffic between the moving cell and the fixed cell is established.

The moving cell serves UEs and thus the UEs regard the moving cell as a serving cell. The moving cell provides group mobility to UEs served thereby through physical movement and handover. In-band communication in the moving cell can support full duplex.

There may be various types of moving cells, as shown in Table 7, and characteristics depending on moving cell type need to be considered.

TABLE 7

| Category | Backhaul Distance | Mobility | Moving Pattern | Access Link User Load |
| --- | --- | --- | --- | --- |
| Public Transportation | Long | Wide speed range | Fixed | Medium/ High |
| Smart Car | Medium/Short | Wide speed range | Arbitrary | Low/ Medium |
| Personal Cell | Various | Low speed range | Arbitrary | Low/ Medium |

Handover to Moving Cell

When moving cells are located around a UE, the UE needs to hand over to a moving cell that moves in the same direction as the UE. For example, if the UE and a first moving cell move in the same direction and the UE and a second moving cell respectively move in crossing directions, the quality of the second moving cell is measured as being higher than the quality of the first moving cell at the intersection of the UE and the second moving cell and thus the UE can hand over to the second moving cell according to the handover method for fixed cells. As the second moving cell moves away from the UE after handover, signal quality is rapidly deteriorated and thus the UE needs to perform handover again. When many moving cells move around the UE in this manner, a target moving cell may be inappropriately selected if the handover method for fixed cells is used.

In other words, the handover method for fixed cells depends only on signal quality when a cell is measured irrespective of whether the cell approaches the UE or not. In this case, whether the cell is a moving cell (e.g., a bus or a train) on which the UE is mounted or a moving cell on which the UE is not mounted cannot be recognized. Accordingly, it is necessary to detect whether the cell is a moving cell on which the UE will be mounted or a moving cell on which the UE is not mounted to perform handover. Distinguished from measurement report trigger conditions defined for fixed cells in the previous handover method, measurement report trigger conditions for moving cells can be newly defined according to embodiments of the present invention.

In addition, to minimize data interruption during handover to a moving cell, the previous handover procedure for disconnecting from a serving cell and connecting to a target cell needs to be modified. According to an embodiment of the present invention, the UE sets secondary connection with a moving cell while maintaining primary connection with a fixed cell and switches secondary connection with the moving cell to primary connection during handover in order to improve QoS.

A description will be given of a method for a UE, which is provided with services by being connected to a fixed cell, to perform handover to a moving cell suitable therefor without data interruption.

Figure 9:
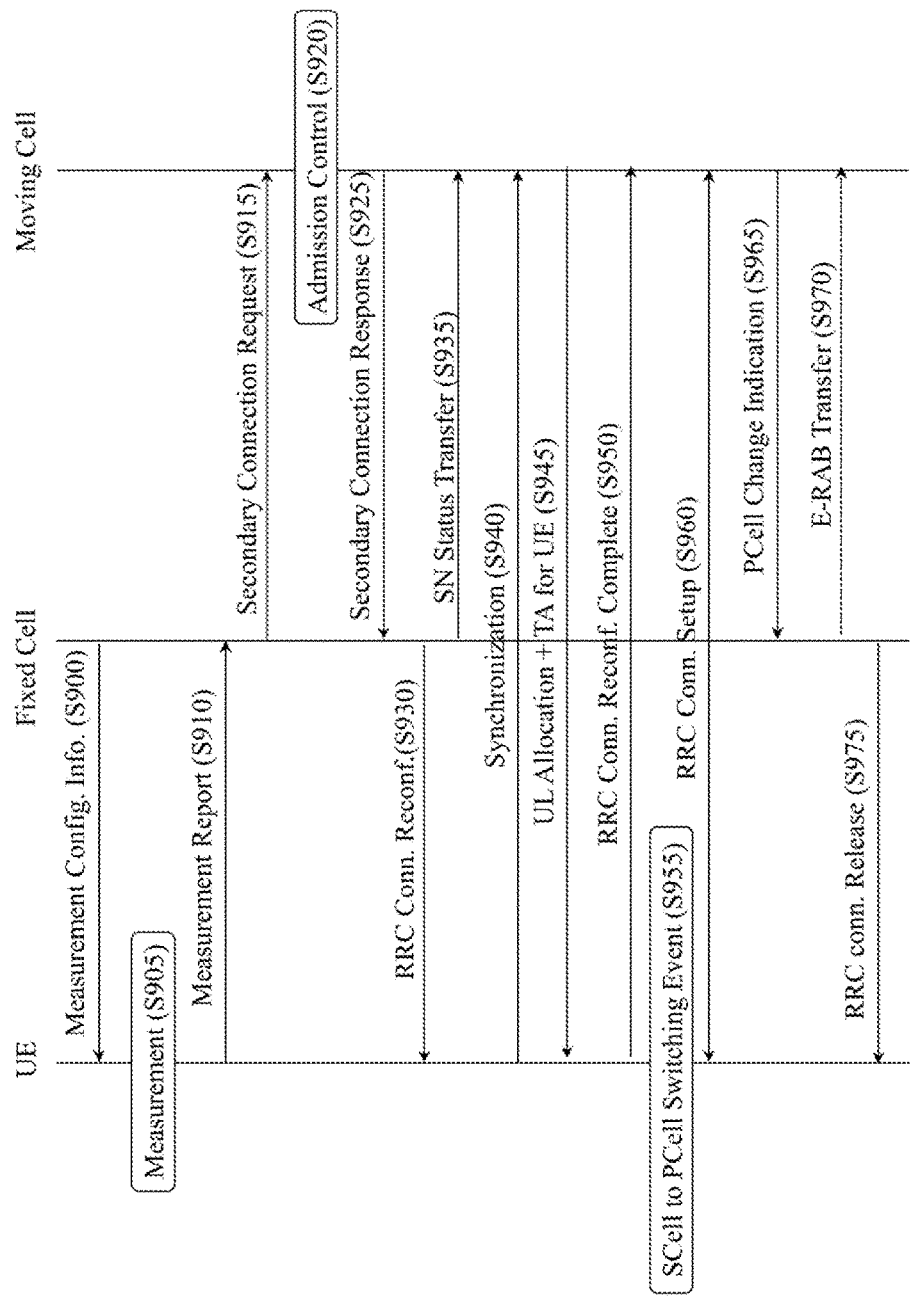
FIG. 9 illustrates a procedure through which a UE hands over to a moving cell according to an embodiment of the present invention.

FIG. 9 illustrates a method by which a UE hands over to a moving cell according to an embodiment of the present invention. While FIG. 9 shows only one moving cell, this is for convenience of description and those skilled in the art can understand that a plurality of moving cells is located around the UE. It is assumed that the UE is served by a fixed cell.

Referring to FIG. 9, the UE receives measurement configuration information from the fixed cell (S900). The measurement configuration information may be provided to the UE through RRC signaling. For example, the measurement configuration information can be provided to the UE through an RRC connection establishment procedure or an RRC connection reconfiguration procedure.

The measurement configuration information may include a measurement object and information on measurement report trigger conditions. The measurement object may include at least one of the physical cell ID of the moving cell, a frequency channel number and offset information.

The moving cell corresponding to the measurement object may be a moving cell connected to the fixed cell. For example, the fixed cell may provide, to the UE, measurement configuration information for instructing the UE to measure the moving cell connected thereto.

The measurement report trigger conditions may be newly defined in consideration of mobility of the moving cell corresponding to the measurement object. For example, events shown in Table 8 are newly defined for measurement reporting in addition to events A1 to A6 shown in Table 6.

TABLE 8

| Event | Report conditions |
| --- | --- |
| Event A3-1 | Moving Cell becomes offset better than PCell and is offset better than PCell after Predefind_Time_Interval |
| Event A4-1 | Moving Cell becomes better than threshold and is better than threshold after Predefined_Time_Interval |

The measurement configuration information may include at least one of events A3-1 and A4-1. When the event A3-1 or A4-1 is set for the UE, the fixed cell may not set the event A3 or A4 for the UE or the UE may not apply the event A3 or A4 for measurement of the moving cell.

The event A3-1 refers to a case in which signal quality of a moving cell is better than a PCell (e.g., fixed cell) by a predetermined offset or more and is still better than the PCell by the offset or more even after a predefined time interval. The offset may be offset information included in the measurement configuration information but the present invention is not limited thereto. The event A4-1 refers to a case in which signal quality of a moving cell is better than a predefined threshold and is still better than the predefined threshold even after the predefined time interval.

In the event A3-1, the UE reports a measurement result of the moving cell to the fixed cell when the signal quality of the moving cell is better than the PCell even after the predefined time interval instead of being temporarily better than the PCell. For example, when measurement results of the moving cell, obtained at a first time and a second time, are better than measurement results of the PCell by the offset or higher, the signal quality of the moving cell can be regarded as being continuously higher than the PCell for a period from the first time to the second time. In this case, the UE can be assumed to move along the moving trajectory of the moving cell. For example, a case in which the moving cell is located at a moving body such as a bus or a train and the UE is mounted on the moving body can be considered.

According to the aforementioned embodiment, measurement report is triggered using measurement at the first time and measurement at the second time after Predefined_Time_Interval from the first time. However, the number of measurements necessary to trigger measurement report is not limited to two. The UE can determine whether to report measurement results using statistical analysis results obtained by measuring the moving cell and the fixed cell N (a natural number of 2 or larger) times. For example, the UE can determine whether to report the measurement results by comparing the average of signal qualities of the moving cell with the average of signal qualities of the fixed cell using results obtained by measuring the moving cell and the fixed cell N times at intervals of Predefined_Time_Interval.

In another embodiment, the UE may further consider the gradient of signal qualities of the moving cell, measured N times, and the gradient of signal qualities of the fixed cell, measured N times. For example, referring to FIG. 11(a), the signal quality of the fixed cell is better than that of the moving cell in the first and second measurements, whereas the signal quality of the moving cell is better than that of the fixed cell in the third measurement. In this case, the signal quality average of the moving cell may be higher than that of the fixed cell. In addition, the signal quality of the moving cell does not reach the threshold of the event A4-1 in the first and second measurements. However, considering the signal quality gradient, the UE and the moving cell have close or similar moving trajectories and the UE can be considered to move away from the fixed cell, and thus the UE can report the measurement results of the moving cell and the fixed cell to the fixed cell.

Figure 11:
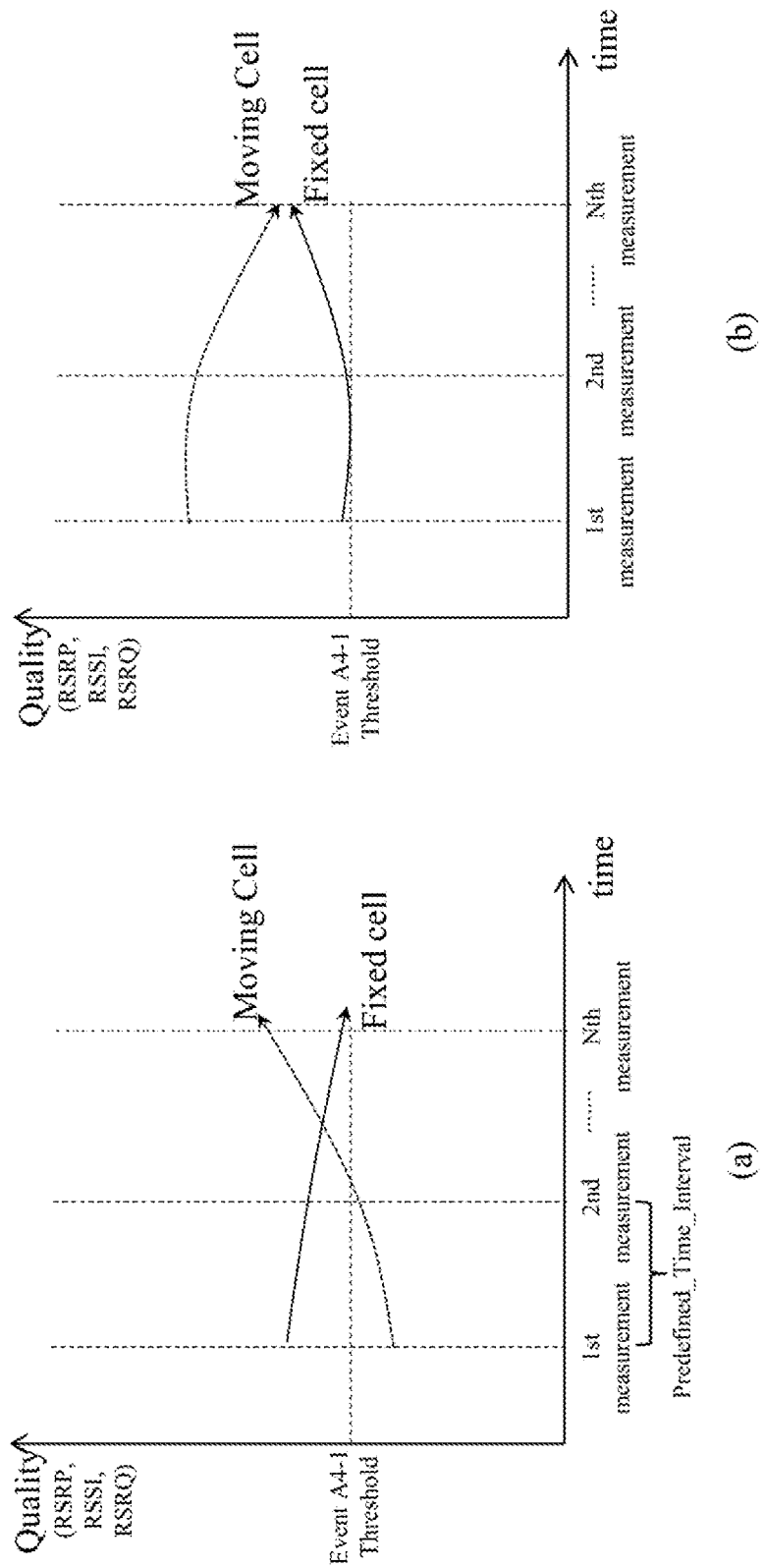
FIG. 11 illustrates measurement report conditions according to an embodiment of the present invention.

Referring to FIG. 11(b), although the signal quality of the moving cell is higher than the signal quality of the fixed cell and the threshold of the event A4-1 from the N measurement results, the signal quality of the moving cell is gradually deteriorated whereas the signal quality of the fixed cell is gradually improved. Accordingly, the moving cell may be regarded as being inappropriate for handover of the UE because the signal quality of the moving cell is expected to be continuously deteriorated, and thus the UE may not report the measurement result of the moving cell to the fixed cell.

As described above, the UE can statistically analyze results obtained by measuring the moving cell and/or the fixed cell N times to determine whether to transmit measurement results to the fixed cell.

An eNB may determine at least one of the number of measurements, N, signal quality gradients used as standards of measurement report and Predefined_Time_Interval. For example, the eNB can determine the aforementioned parameters in consideration of at least one of the radio network environment, the moving speed of the moving cell and the moving speed of the UE. More specifically, the eNB may set Predefined_Time_Interval to a small value when the moving cell or the UE rapidly moves and set Predefined_Time_Interval to a large value when the moving cell or the UE slowly moves. That is, Predefined_Time_Interval may be inversely proportional to the moving speed of the moving cell or the UE.

Referring back to FIG. 9, the UE performs measurement as described above (S905) and transmits a measurement report to the fixed cell (S910).

Upon reception of the measurement report, the fixed cell sends a message for requesting secondary connection with the UE to the moving cell (S915). An RRC connection reconfiguration request message may be used for the secondary connection request but the present invention is not limited thereto. Secondary connection may be considered as an SCell in carrier aggregation. That is, the UE can set secondary connection with the moving cell by adding the moving cell as an SCell and activating the moving cell. The secondary connection request message may include the ID and context information of the UE. The context information of the UE may include at least one of at least part of E-RAB (E-UTRAN Radio Access Bearer) information, UE capability, information related to radio resources configured by the fixed cell for the UE (e.g., RadioResourceConfigDedicated IE defined in LTE/LTE-A TS36.331) and indication indicating that the UE will set the moving cell as secondary connection. However, the present invention is not limited thereto.

The moving cell controls approval of the secondary connection request (S920). The moving cell determines whether to grant RABs corresponding to the UE on the basis of E-RAB related information from among the context information of the UE.

The moving cell transmits a secondary connection response message to the fixed cell depending on an approval control result (S925). An RRC connection reconfiguration ACK message may be used as the secondary connection response message, but the present invention is not limited thereto. The secondary connection response message represents whether the moving cell sets secondary connection with the UE. The secondary connection response message may include the UE ID, information on E-RAB granted for the UE, a dedicated preamble necessary to switch the UE to primary connection in the future, a C-RNTI to be used by the UE in the moving cell after the moving cell is switched to primary connection with the UE, etc. Here, the C-RNTI used for primary connection may be identical to or different from a C-RNTI used for secondary connection. The secondary connection response message may include information indicating that the moving cell has been set to secondary connection for the UE (e.g., SCell configuration).

The fixed cell transmits an RRC connection reconfiguration message to the UE (S930). The RRC connection reconfiguration message may be used to instruct the UE to set the moving cell to secondary connection. For example, the RRC connection reconfiguration message can instruct the UE to add the moving cell as an SCell. The RRC connection reconfiguration message may include at least one of indication for setting secondary connection, indication for switching the moving cell set as secondary connection to primary connection, the C-RNTI to be used by the UE in the moving cell after the moving cell is set to secondary connection, and a dedicated preamble necessary to perform contention free random access for the moving cell. Table 9 shows an RRC connection reconfiguration message according to an embodiment of the present invention. Comparing Table 9 with Table 1, it can be confirmed that bolded portions in Table 9 are newly defined for handover to the moving cell.

TABLE 9

```
RRCConnectionReconfiguration ::=            SEQUENCE {
    rrc-TransactionIdentifier               RRC-TransactionIdentifier,
    criticalExtensions                      CHOICE {
        c1                                  CHOICE{
            rrcConnectionReconfiguration-r8     RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE { } }}
RRCConnectionReconfiguration-r8-IEs ::= SEQUENCE {
    measConfig                              MeasConfig                                      OPTIONAL,       -- Need ON
    mobilityControlInfo                     MobilityControlInfo                             OPTIONAL,       -- Cond HO
    dedicatedInfoNASList                    SEQUENCE (SIZE(1..maxDRB)) OF
                                                DedicatedInfoNAS                            OPTIONAL,       -- Cond nonHO
    radioResourceConfigDedicated            RadioResourceConfigDedicated                    OPTIONAL,       -- Cond HO-toEUTRA
    securityConfigHO                        SecurityConfigHO                                OPTIONAL,       -- Cond HO
    nonCriticalExtension                    RRCConnectionReconfiguration-v890-IEs           OPTIONAL        -- Need OP}
RRCConnectionReconfiguration-v890-IEs ::= SEQUENCE {
    lateNonCriticalExtension                OCTET STRING                                    OPTIONAL,       -- Need OP
    nonCriticalExtension                    RRCConnectionReconfiguration-v920-IEs           OPTIONAL        -- Need OP}
RRCConnectionReconfiguration-v920-IEs ::= SEQUENCE {
    otherConfig-r9                          OtherConfig-r9                                  OPTIONAL,       -- Need ON
    fullConfig-r9                           ENUMERATED {true}                               OPTIONAL,       -- Cond HO-Reestab
    nonCriticalExtension                    RRCConnectionReconfiguration-v1020-IEs          OPTIONAL        -- Need OP}
RRCConnectionReconfiguration-v1020-IEs ::= SEQUENCE {
    sCellToReleaseList-r10                  SCellToReleaseList-r10                          OPTIONAL,       -- Need ON
    sCellToAddModList-r10                   SCellToAddModList-r10                           OPTIONAL,       -- Need ON
    nonCriticalExtension                    RRCConnectionReconfiguration-v1130-IEs          OPTIONAL        -- Need OP}
RRCConnectionReconfiguration-v1130-IEs ::= SEQUENCE {
    systemInfomationBlockType1Dedicated-r11 OCTET STRING (CONTAINING SystemInformationBlockType1)
                                                                                            OPTIONAL,       -- Need ON
    nonCriticalExtension                    SEQUENCE { }                                    OPTIONAL        -- Need OP}
SCellToAddModList-r10 ::=                   SEQUENCE (SIZE (1..maxSCell-r10)) OF SCellToAddMod-r10
SCellToAddMod-r10 ::=                       SEQUENCE {
    sCellIndex-r10                          SCellIndex-r10,
    cellIdentification-r10                  SEQUENCE {
        physCellId-r10                      PhysCellId,
        dl-CarrierFreq-r10                  ARFCN-ValueEUTRA
    }                                                                                       OPTIONAL,       -- Cond SCellAdd
    radioResourceConfigCommonSCell-r10      RadioResourceConfigCommonSCell-r10              OPTIONAL,       -- Cond SCellAdd
    radioResourceConfigDedicatedSCell-r10   RadioResourceConfigDedicatedSCell-r10                           OPTIONAL,       -- Cond SCellAdd2
    ...,
    [[  dl-CarrierFreq-v1090                ARFCN-ValueEUTRA-v9e0       OPTIONAL            -- Cond EARFCN-max
    ]]
    nonCriticalExtension                    SCellToAddMod-r1x                               OPTIONAL        -- Need OP}
SCellToAddMod-r1x ::=                       SEQUENCE {
    sCellIndex-r10                          SCellIndex-r10,
    cellIdentification-r1x                  SEQUENCE {
        physCellId-r10                      PhysCellId,
        dl-CarrierFreq-r10                  ARFCN-ValueEUTRA
        Moving Cell Indicator               BOOLEAN
        SCellToPCellChangeIndicator         BOOLEAN
    }                                                                                       OPTIONAL,       -- Cond SCellAdd
    radioResourceConfigCommonSCell-r10      RadioResourceConfigCommonSCell-r10              OPTIONAL,       --Cond SCellAdd
    radioResourceConfigDedicatedSCell-r10   RadioResourceConfigDedicatedSCell-r10                           OPTIONAL,       -- Cond SCellAdd2
    ...,
    [[  dl-CarrierFreq-v1090                ARFCN-ValueEUTRA-v9e0       OPTIONAL            -- Cond EARFCN-max
    ]]
    ScellToPcellChangeControl               SCellToPCellChangeControl                       OPTIONAL,       -- Cond HO}
SCellToPCellChangeControl ::=               SEQUENCE      {
    newUE-IdentityforSCellToPCellChange     C-RNTI
    rach-ConfigDedicated                    RACH-ConfigDedicated                            OPTIONAL,       -- Need OP }
SCellToReleaseList-r10 ::=                  SEQUENCE (SIZE (1..maxSCell-r10)) OF SCellIndex-r10
SecurityConfigHO ::=                        SEQUENCE {
    handoverType                            CHOICE {
        intraLTE                            SEQUENCE {
            securityAlgorithmConfig             SecurityAlgorithmConfig                     OPTIONAL,       -- Cond fullConfig
            keyChangeIndicator                  BOOLEAN,
            nextHopChainingCount                NextHopChainingCount
        },
```

TABLE 9-continued

| | | | | |
|---|---|---|---|---|
| interRAT | SEQUENCE { | | | |
| securityAlgorithmConfig | SecurityAlgorithmConfig, | | | |
| nas-SecurityParamToEUTRA | OCTET STRING (SIZE(6)) | } | }, | ...} |

The RRC connection reconfiguration message may include a time when secondary connection is switched to primary connection or information about a trigger event. For example, information about an event of switching secondary connection to primary connection when the signal quality of the fixed cell becomes lower than a threshold, an event of switching secondary connection to primary connection when the signal quality of the moving cell exceeds the threshold after predetermined time or the like may be included in the RRC connection reconfiguration message. However, the present invention is not limited thereto. In another embodiment, secondary connection is set for the moving cell, the UE may immediately switch secondary connection to primary connection.

The fixed cell transmits an SN status transfer message to the moving cell in order to deliver status information about E-RAB transmitted to the UE on DL or received from the UE on UL (S935).

The UE performs synchronization with the moving cell using information (e.g., dedicated preamble) included in the RRC connection reconfiguration message (S940).

The moving cell sends resources for UL transmission and timing advanced (TA) information to the UE (S945).

The UE transmits an RRC connection reconfiguration complete message to the moving cell (S950). This is a procedure for notifying the network that the UE has set secondary connection.

When an event of switching secondary connection to primary connection is generated in the UE (S955), the UE sets RRC connection in order to switch secondary connection with the moving cell to primary connection (S960). Upon generation of the event of switching secondary connection to primary connection, the UE starts a procedure for switching secondary connection to primary connection without transmitting the measurement report. FIG. 9 assumes that the event of switching secondary connection to primary connection is set for the UE when the signal quality of the fixed cell is lower than the threshold.

The moving cell sends a PCell change indication message indicating that secondary connection has been switched to primary connection to the fixed cell (S965).

The fixed cell transmits information about E-RAB of the UE and information about E-RAB transmitted on DL or received on UL to the moving cell through an E-RAB transfer message (S970). This procedure may be skipped when all E-RAB information about the UE has been delivered in step S915.

The fixed cell transmits an RRC connection release message for releasing RRC connection with the UE (S975). As described above, handover to the moving cell is performed by switching secondary connection to primary connection without disconnecting the UE from the fixed cell, distinguished from handover to the fixed cell. The UE releases connection to the fixed cell because handover to the fixed cell may be performed excessively frequently as the UE is mounted on the moving cell and moved.

In another embodiment of immediately switching secondary connection to primary connection, different from the aforementioned embodiment, the RRC connection reconfiguration complete message in S950 may be used to notify the network that the UE has switched secondary connection to primary connection. In this case, the E-RAB information included in the secondary connection request message includes all E-RAB information currently served through the fixed cell. In addition, RRC connection setup and E-RAB transfer message between the UE and the moving cell may be omitted. Furthermore, the primary connection switch indication included in the RRC connection reconfiguration message may be understood as an indication for immediately switching the moving cell to primary connection.

Figure 10:
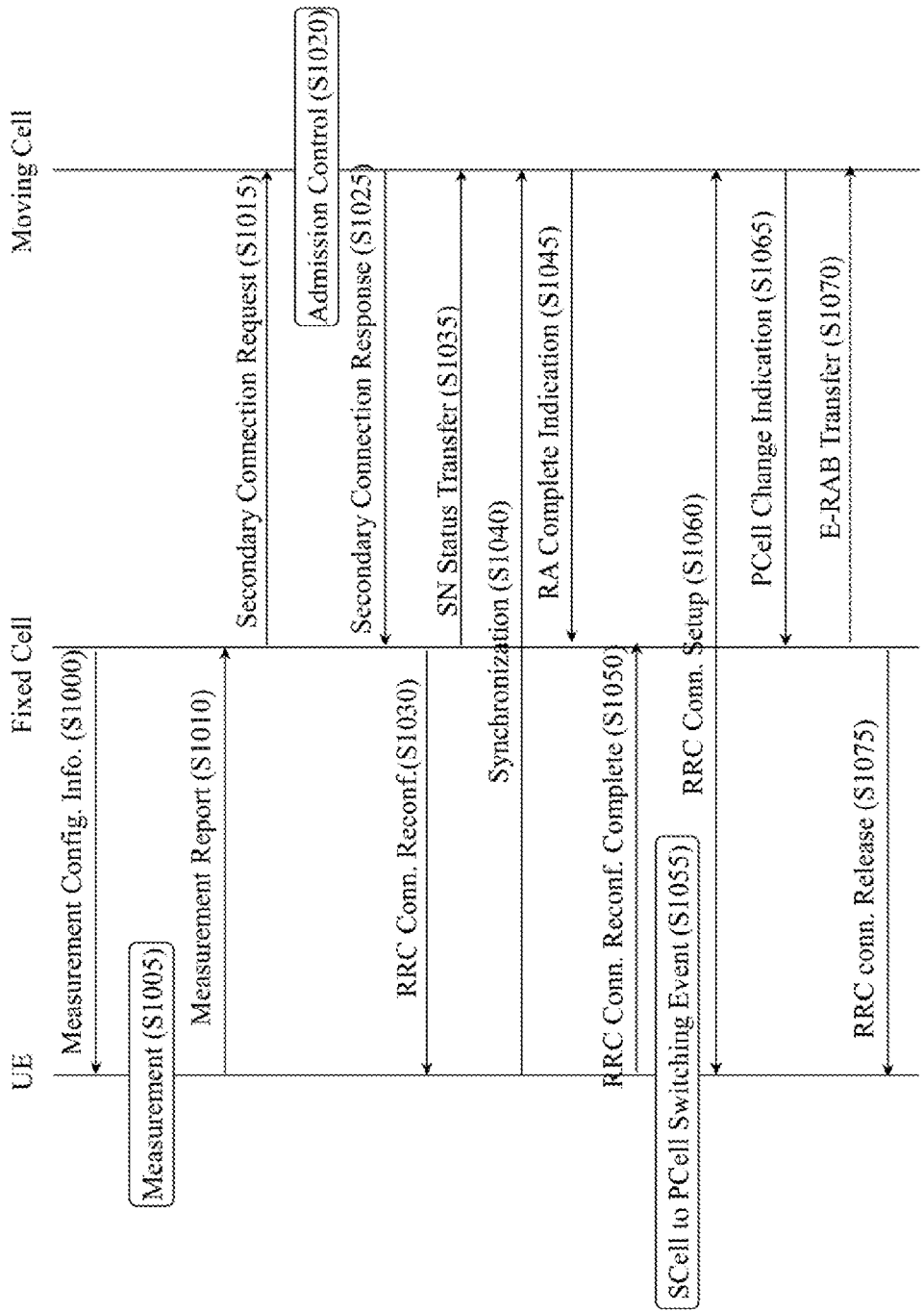
FIG. 10 illustrates a procedure through which a UE hands over to a moving cell according to another embodiment of the present invention.

FIG. 10 illustrates a method by which the UE hands over to the moving cell according to another embodiment of the present invention. Redundant description in FIGS. 9 and 10 is omitted. In the present embodiment, it is assumed that the UE switches secondary connection to primary connection when the quality of the moving cell exceeds the threshold after a predetermined time as a condition for switching secondary connection to primary connection.

The UE receives measurement configuration information (S1000) and measures the moving cell and/or the fixed cell according to the measurement configuration information (S1005). The UE transmits a measurement report to the fixed cell (S1010).

The fixed cell transmits a secondary connection request message to the moving cell (S1015) and receives a secondary connection response message from the moving cell (S1025). The secondary connection request message may not include all E-RAB information provided to the UE through the fixed cell. The fixed cell sends an RRC connection reconfiguration message to the UE (S1030) and transmits an SN status transfer message to the moving cell (S1035).

The RRC connection reconfiguration message may include information that instructs the UE to switch secondary connection to primary connection when the quality of the moving cell exceeds the threshold after the predetermined time as a condition for switching secondary connection to primary connection.

The UE performs synchronization with the moving cell through a contention free random access procedure (S1040).

The moving cell sends an RA complete indication message indicating that the random access procedure of the UE has successfully completed to the fixed cell (S1045).

The UE transmits an RRC connection reconfiguration complete message to the fixed cell (S1050). This is a procedure for notifying the network that the UE changes bearer setup with respect to the fixed cell and completes secondary connection with the moving cell.

Upon generation of an event for switching secondary connection to primary connection in the UE (S1055), the UE switches secondary connection with the moving cell to primary connection (S1060).

The moving cell sends a PCell change indication message to the fixed cell (S1065) and the fixed cell sends an E-RAB transfer message to the moving cell (S1070). The fixed cell releases RRC connection with the UE (S1075).

Figure 12:
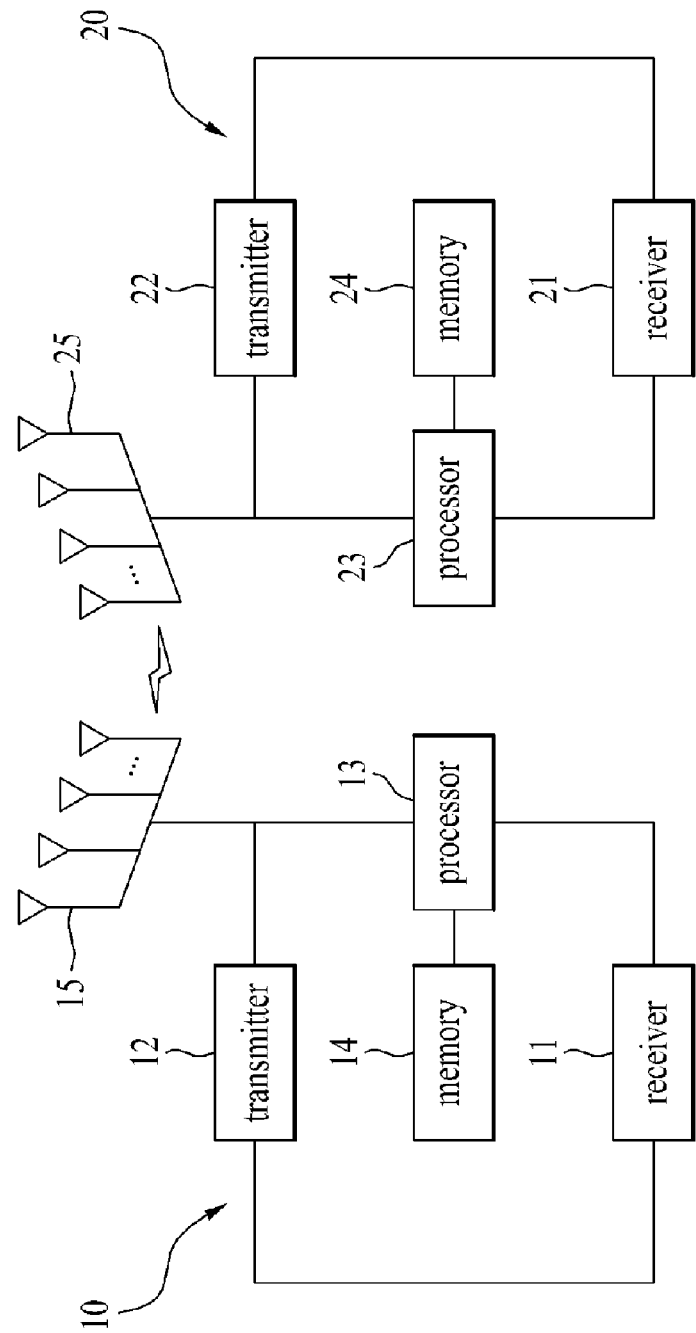
FIG. 12 illustrates a UE and a cell according to an embodiment of the present invention.

FIG. 12 illustrates structures of a UE and an eNB according to an embodiment of the present invention. The eNB may be a fixed cell or a moving cell. The UE and the eNB illustrated in FIG. 12 may perform the aforementioned methods.

The eNB 10 may include a receiver 11, a transmitter 12, a processor 13, a memory 14 and a plurality of antennas 15. The antennas 15 mean that the eNB supports MIMO transmission and reception. The receiver 11 may receive signals, data and information from the UE on uplink. The transmitter 12 may transmit signals, data and information to the UE on downlink. The processor 13 may control the overall operation of the eNB 10.

In addition, the processor 13 of the eNB 10 may process information received thereby and information to be transmitted. The memory 14 may store processed information for a predetermined time and may be replaced by a component such as a buffer (not shown).

When the eNB 10 is a fixed cell according to an embodiment, the transmitter 12 transmits measurement configuration information including measurement report conditions for a moving cell connected to the fixed cell to the UE. When a measurement result of the moving cell satisfies the measurement report conditions, the receiver 11 receives the measurement result of the moving cell from the UE. The processor 13 generates an RRC connection reconfiguration message indicating that secondary connection for the moving cell is set in addition to primary connection for the fixed cell. The RRC connection reconfiguration message may include conditions for releasing primary connection for the fixed cell and switching secondary connection for the moving cell to primary connection for handover of the UE to the moving cell.

The UE 20 may include a receiver 21, a transmitter 22, a processor 23, a memory 24 and a plurality of antennas 25. The antennas 25 mean that the UE supports MIMO transmission and reception. The receiver 21 may receive signals, data and information from the eNB on downlink. The transmitter 22 may transmit signals, data and information to the eNB on uplink. The processor 23 may control the overall operation of the UE 20.

In addition, the processor 23 of the UE 20 may process information received thereby and information to be transmitted. The memory 24 may store processed information for a predetermined time and may be replaced by a component such as a buffer (not shown).

According to an embodiment of the present invention, the receiver 21 receives measurement configuration information including measurement report conditions for a moving cell from the fixed cell. When a measurement result of the moving cell satisfies the measurement report conditions, the transmitter 22 reports the measurement result of the moving cell to a fixed cell. The processor 23 sets secondary connection for the moving cell in addition to primary connection for the fixed cell. The processor 23 releases primary connection for the fixed cell and switches secondary connection for the moving cell to primary connection, thereby handing over to the moving cell.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein. Therefore, the present invention is not limited to the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The aforementioned embodiments of the present invention can be applied to various mobile communication systems.

The invention claimed is:

1. A method of performing handover to a moving cell by a user equipment (UE) connected to a fixed cell, comprising:
   receiving, from the fixed cell, measurement configuration information including a measurement report condition for the moving cell and information about a moving cell measurement time interval;
   if a measurement result for the moving cell satisfies the measurement report condition, reporting, to the fixed cell, the measurement result for the moving cell;
   setting a secondary connection for the moving cell in addition to a primary connection for the fixed cell; and
   performing handover to the moving cell by releasing the primary connection for the fixed cell and switching the secondary connection for the moving cell to a new primary connection.

2. The method according to claim 1, wherein the reporting of the measurement result for the moving cell to the fixed cell comprises measuring the moving cell at least twice to determine whether to report the measurement result for the moving cell.

3. The method according to claim 2, wherein the determining of whether to report the measurement result for the moving cell comprises determining that the measurement result for the moving cell is are reported to the fixed cell when a signal quality of the moving cell is higher than a signal quality of the fixed cell by a predetermined offset or more at both a first time and a second time.

4. The method according to claim 2, wherein the determining of whether to report the measurement result for the moving cell comprises determining that the measurement result for the moving cell is are reported to the fixed cell when a signal quality of the moving cell is higher than a predetermined threshold at both a first time and a second time.

5. The method according to claim 1, wherein the information about the moving cell measurement time interval is determined on the basis of at least one of a moving speed of the moving cell and a moving speed of the UE.

6. The method according to claim 1, further comprising receiving a message including a condition for switching the secondary connection for the moving cell to the new primary connection.

7. The method according to claim 6, wherein the condition for switching the secondary connection for the moving cell to the new primary connection includes at least one of a case in which a signal quality of the fixed cell becomes lower than a first threshold and a case in which a signal quality of the moving cell becomes higher than a second threshold after a specific time.

8. A method of supporting handover of a user equipment (UE) by a fixed cell, comprising:
transmitting, to the UE, measurement configuration information including a measurement report condition for a moving cell connected to the fixed cell and information about a moving cell measurement time interval;
if a measurement result for the moving cell satisfies the measurement report condition, receiving the measurement result for the moving cell from the UE; and
transmitting, to the UE, a radio resource control (RRC) connection reconfiguration message instructing the UE to set a secondary connection for the moving cell in addition to a primary connection for the fixed cell,
wherein the RRC connection reconfiguration message includes a condition for releasing the primary connection for the fixed cell and switching the secondary connection for the moving cell to a new primary connection for handover of the UE to the moving cell.

9. The method according to claim 8, wherein the measurement report condition for the moving cell include at least one of a case in which a signal quality of the moving cell is higher than a signal quality of the fixed cell by a predetermined offset or more at both a first time and a second time and a case in which the signal quality of the moving cell is higher than a predetermined threshold at both the first time and the second time.

10. The method according to claim 8, wherein the information about the moving cell measurement time interval is determined on the basis of at least one of a moving speed of the moving cell and a moving speed of the UE.

11. The method according to claim 8, wherein the condition for switching the secondary connection for the moving cell to the new primary connection include at least one of a case in which a signal quality of the fixed cell becomes lower than a first threshold and a case in which a signal quality of the moving cell becomes higher than a second threshold after a specific time.

12. A user equipment (UE) performing handover from a fixed cell to a moving cell, comprising:
a receiver for receiving, from the fixed cell, measurement configuration information including a measurement report condition for the moving cell and information about a moving cell measurement time interval;
a transmitter for reporting, to the fixed cell, a measurement result for the moving cell if the measurement result for the moving cell satisfies the measurement report condition; and
a processor for setting a secondary connection for the moving cell in addition to a primary connection for the fixed cell and performing handover to the moving cell by releasing the primary connection for the fixed cell and switching the secondary connection for the moving cell to a new primary connection.

13. A fixed cell supporting handover of a user equipment (UE), comprising:
a transmitter for transmitting, to the UE, measurement configuration information including a measurement report condition for a moving cell connected to the fixed cell and information about a moving cell measurement time interval;
a receiver for receiving a measurement result for the moving cell from the UE if the measurement result for the moving cell satisfies the measurement report condition; and
a processor for generating a radio resource control (RRC) connection reconfiguration message instructing the UE to set a secondary connection for the moving cell in addition to a primary connection for the fixed cell,
wherein the RRC connection reconfiguration message includes a condition for releasing the primary connection for the fixed cell and switching the secondary connection for the moving cell to a new primary connection for handover of the UE to the moving cell.

* * * * *